June 21, 1960  W. B. BOYUM  2,941,781
GUIDE VANE ARRAY FOR TURBINES
Filed Oct. 13, 1955
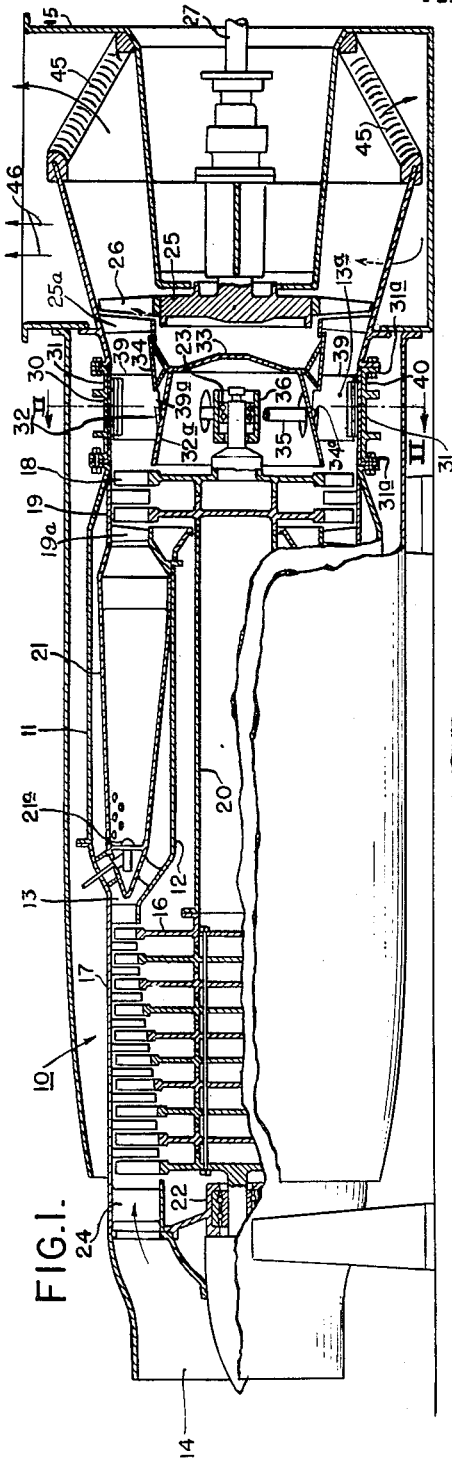
FIG.1.
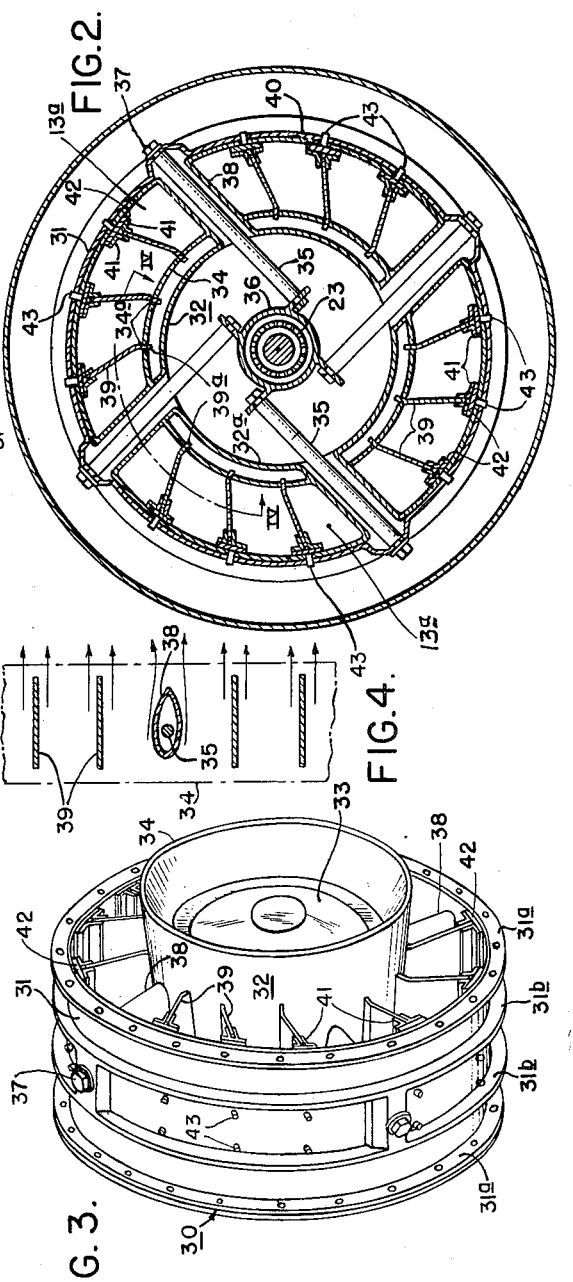
FIG.2.
FIG.4.
FIG.3.
INVENTOR
WILLIAM B. BOYUM
BY Robert T. French
ATTORNEY United States Patent Office 2,941,781
Patented June 21, 1960

2,941,781
GUIDE VANE ARRAY FOR TURBINES

Willliam B. Boyum, Ridley Park, Pa., assignor to Westinghouse Electric Corporation, East Pittsburgh, Pa., a corporation of Pennsylvania Filed Oct. 13, 1955, Ser. No. 540,211

6 Claims. (Cl. 253—39)

This invention relates to vibration control for rotary blading of fluid utilizing machines, more particularly to apparatus for controlling vibration induced in rotary blading by incoming flow of fluid through an annular passageway, and has for an object to provide apparatus for substantially reducing such blade vibrations to a safe value.

In a recently proposed axial flow gas turbine engine having a turbine rotor for driving a compressor and having a second turbine rotor disposed downstream of the first turbine rotor and employed for take-off power purposes, the rear bearing for the first turbine rotor is supported by a plurality of struts extending through the exhaust collector, i.e., the annular fluid passageway between the turbine rotors. During operation of the engine, the bearing supporting struts create separate and distinct pressure disturbances, i.e. flow separation causing wakes, which provide spaced impulses of high amplitude on the blades of the second turbine rotor. At normal running speeds, the impulse frequency of the strut wakes coincides with a resonant frequency on the blades of the second turbine rotor, thereby causing serious vibration in the blades, leading to ultimate fatigue failure. For example, when four struts are employed, the impulse frequency of the strut wakes is four times the running speed of the turbine rotor. However, due to mechanical difficulties and for other reasons, it is not desirable to remove the offending bearing supporting struts from this fluid passageway.

In view of the above, it is another object of the invention to provide, in a fluid utilizing machine having a bearing supporting strut structure extending across an annular fluid passageway for delivering fluid from one bladed rotor to another bladed rotor, an arrangement for reducing the magnitude of the pressure disturbances or wakes caused by the struts and increasing the number of such wakes, so that the frequency of the impulses on the downstream rotor blades is sufficiently high to be out of tune or resonance with the natural frequency of the blades.

It is a further object of the invention to provide in a gas turbine engine having a first turbine rotor, a second turbine rotor driven by the exhaust gases from the first rotor, and a bearing supporting strut arrangement for one of the rotors extending through the exhaust gas passageway; an arrangement for straightening the flow of the exhaust gas as well as reducing the magnitude of the pressure disturbances caused by the struts.

In accordance with the invention, the exhaust collector structure providing the fluid passageway between the two turbines is provided with the usual faired struts for supporting the rear engine bearing. In addition, a plurality of preferably uniformly spaced guide vanes of simple configuration are interposed between the struts to increase the number of original pressure disturbances or wakes sufficiently, so that the frequency of their impulses on the turbine rotor blades is increased to a considerably higher value than the frequency of vibration of the turbine rotor blades in the operational speed range. With this arrangement, the vibration of the turbine blades is dampened, since the frequencies of the blades and of the fluid impulses are not in resonance. Also, the undesirably high amplitudes of the original pressure disturbances are considerably reduced.

The above and other objects are effected by the invention as will be apparent from the following description taken in connection with the accompanying drawings, forming a part of this application, in which:

Fig. 1 is an axial sectional view of a gas turbine engine having the invention incorporated therein;

Fig. 2 is a cross-sectional view taken on line II—II of Fig. 1;

Fig. 3 is a perspective view of the exhaust collector portion of the engine shown in Fig. 1; and Fig. 4 is a developed fragmentary view taken on line IV—IV of Fig. 2.

Referring to Fig. 1 of the drawing, there is shown diagrammatically a gas turbine engine 10 comprising a cylindrical outer casing 11 having mounted therein core structure 12 which, together with the outer casing, provides an annular passageway 13, which extends longitudinally through the engine from an air inlet 14 to a discharge structure 15. Mounted in axial alignment within the outer casing 11 and defining a spindle aggregate are a compressor rotor 16 of an axial-flow compressor 17, and a bladed rotor 18 of a turbine 19, the two rotors being coupled by means of a suitable hollow shaft 20. The turbine 19 is provided with an annular array of suitable nozzles 19a, as well known in the art, for directing the gas flow through the blades of the turbine rotor 18. Between the compressor 17 and the turbine 19, there is provided fuel combustion apparatus of any suitable type comprising a combustion chamber 21 provided with fuel injecting means 21a.

The spindle aggregate, comprising the compressor rotor 16, hollow shaft 20 and turbine rotor 18, is supported by a pair of bearing assemblies comprising a front radial and thrust bearing assembly 22 and a rear radial bearing assembly 23. The thrust bearing assembly 22 may be supported by suitable radially arranged struts 24, while the rear bearing assembly 23 is supported in a manner subsequently to be described.

Intermediate the turbine 19 and the exhaust structure 15, there is provided a second or power take-off turbine 25 comprising a bladed rotor 26 rotatably supported in any desired manner adjacent the discharge structure 15 and having a shaft 27 extending outwardly thereof for power take-off purposes. In a manner similar to that employed in connection with the turbine 19, the turbine 25 is provided with an annular array of suitable stationary nozzles 25a, as well known in the art, for directing the gas flow through the blades of the turbine rotor 26.

The compressor driving turbine 19 and the power take-off turbine are disposed in spaced coaxial alignment with each other and in accordance with the invention, there is provided between the two turbines a preferably unitary exhaust collector structure 30, shown in perspective in Fig. 3, which, as will now be described, serves to support the rear bearing assembly 23, provides a fluid communication between the two turbines and controls the flow of fluid from the first turbine 19 to the power take-off turbine 25.

The exhaust collector structure 30 comprises an outer cylindrical casing member 31 and an inner concentric core member 32 which together define an annular fluid passageway 13a acting as a continuation of the fluid passageway 13, previously described. The outer casing is provided with a pair of flanges 31a for attachment to the engine casing 11 and the turbine 25 and a plurality of annular reinforcing ribs 31b. The inner core member 32 has a tubular portion 32a and further comprises a closure member 33 at its downstream end having a conical portion 34 encompassing a portion of the tubular core portion 32a and together therewith serving to shield the rear bearing 23 from the high temperatures of the motivating gases.

The rear bearing 23 is supported within the structure 30 by a plurality of uniformly and angularly spaced struts 35 attached in a tangential manner to the bearing housing 36 and extending outwardly through the inner core member 32 and the casing member 31, and being attached to the latter by suitable fastening means such as bolts 37. Each of the struts is encased in a suitable fairing member 38 extending across the annular passageway and rigidly attached to the core member 32 and the outer casing member 31 by welding or the like. The above briefly described rear bearing support arrangement is more fully shown and described in G. M. Mierley Patent 2,616,662, issued November 4, 1952 and assigned to the assignee of the present invention.

The exhaust collector structure 30 is further provided with a plurality of equally angularly spaced guide vanes 39 made of sheet metal and extending from the core member 32 across the passageway 13a to the casing 31. Each of guide vanes 39 is provided at its innermost end with a tab 39a which is received in a mating slot 34a provided in the conical portion 34 of the core member 32, while its outermost end, as best shown in Fig. 2, is slidably received in a guide plate structure 40 comprising a pair of angle plates 41 attached to a central plate 42. The central plate 42 has a pair of dowel pins 43 which in turn are received in mating holes in the casing member 31 to thereby secure the guide plate structure.

Referring to Fig. 4, it will be seen that the guide vanes 39 need not be faired, since they are of relatively thin rectangular cross-section and present less interference to fluid flow than the considerably thicker fairing members 38. The guide vanes 39 and the fairing members 38 are preferably disposed in planes parallel to the longitudinal axis of the engine for a purpose which will subsequently be described.

According to the well-known principle of operation of a gas turbine engine, air entering the air inlet 14 is compressed by the compressor 17 and delivered to the combustion chamber 21, where fuel supplied by the fuel injecting means 21a is ignited to provide hot motive fluid under pressure. The motive fluid flows past the turbine nozzles 19a and is partially expanded through the turbine 19 to effect operation of the compressor 17 and then flows through the passageway 13a of the exhaust collector 30 to the power take-off turbine 25, where it flows past the turbine nozzles 25a and the bladed rotor 26 and is further expanded to drive the power take-off shaft 27. The motive fluid is then exhausted through the discharge structure 15 to atmosphere. The discharge structure may be of any conventional type. However, as shown, it is provided with an annular array of turning vanes 45 to deflect and diffuse the exhaust fluid from the horizontal plane to the vertical, so that the fluid may be discharged upwardly in the direction of the arrows 46 through a stack (not shown).

As the fluid leaves the compressor driving turbine 19 it has a whirling or vortical component. This vortical component is removed by the guide vanes 39, so that the fluid is delivered to the turbine 25 in a plurality of axially flowing streams conducive to best turbine performance. The number of fluid streams in the illustrated embodiment is sixteen, since four strut fairing members 38 and twelve guide vanes 39 are provided. The guide vanes serve to reduce or dampen the four pressure disturbances occasioned by the strut fairing members and introduce twelve additional but considerably smaller pressure disturbances, so that their effect on the blades of the turbine rotor 26 is more uniformly distributed. That is, the severity of the wakes which would be created by the four strut fairing members 38 is reduced by the additional formation of twelve considerably smaller wakes induced by the guide vanes.

In addition to the above phenomena, the frequency of the exciting force of the sixteen wakes on the blades of the turbine rotor 26 is now sixteen times running speed of the rotor instead of four times running speed. Since the frequency of the exciting force is increased considerably, blade resonance will occur at a much lower speed of the turbine rotor, well out of the operating range, so that vibration of the blades is not sustained but is transient in nature. Also, since the magnitude of the exciting force of the wakes is considerably decreased, the transient vibration of the blades as the rotor passes through the resonance range is considerably reduced, to a safe value.

Although twelve guide vanes have been employed in the illustrated embodiment, it will be understood that more or less vanes may be employed as desired to suit the specific application.

Also, although the vanes have been illustrated as uniformly spaced and extending parallel to the longitudinal axis of the exhaust collector; they may, if desired, be advantageously disposed in unequally spaced relation with each other and/or the struts and may be disposed at an angle with the longitudinal axis of the collector in some applications.

It will now be seen that the invention provides a rugged and simple, yet inexpensive arrangement for controlling vibration of the blades in a turbine disposed downstream of a first turbine where, due to bearing support considerations, a plurality of struts extend through the motive fluid passage between the two turbines.

Although only one embodiment has been shown, it will be obvious to those skilled in the art that it is not so limited, but is susceptible of various changes and modifications without departing from the spirit thereof.

What is claimed is:

1. In an axial flow elastic fluid turbine engine having a first bladed turbine rotor and an annular array of stationary nozzles associated therewith, a second bladed turbine rotor and an annular array of stationary nozzles associated therewith, said first and second rotors being disposed in axially spaced relation with each other, annular fluid passageway structure interposed between said rotors, a bearing disposed between said rotors for rotatably supporting one of said rotors, and means for supporting said bearing including a plurality of angularly spaced struts extending outwardly across said passageway; means for reducing the magnitude of the wakes caused by said strut members and for providing an increased number of smaller wakes, said last mentioned means including a plurality of angularly spaced guide vanes interposed between said struts and extending outwardly across said passageway, said guide vanes being substantially straight and of relatively less thickness than said strut members in a direction normal to the fluid flow through the passageway, and said guide vanes and strut members being uniformly spaced and disposed in planes parallel to the longitudinal axis of said passageway.

2. In an axial flow elastic fluid turbine engine having a first bladed turbine rotor and an annular array of stationary nozzles associated therewith, a second bladed turbine rotor and an annular array of stationary nozzles associated therewith, said first and second rotors being disposed in axially spaced relation with each other, annular fluid passageway structure interposed between said rotors, a bearing disposed between said rotors for rotatably supporting one of said rotors, and means for supporting said bearing including a plurality of angularly spaced struts having fairing members of airfoil shape extending across said passageway; means for reducing the magnitude of the wakes caused by said fairing members and for providing an increased number of smaller wakes, said means including a plurality of angularly spaced guide vanes interposed between said struts and extending outwardly across said passageway, said guide vanes being subtantially flat and of relatively less thickness than the fairing members in a direction normal to the fluid flow through the passageway, and said guide vanes and fairing members being uniformly spaced and disposed in planes parallel to the longitudinal axis of said passageway.

3. In an axial flow elastic fluid turbine engine having a first bladed turbine rotor and an annular array of stationary nozzles associated therewith, a second bladed turbine rotor and an annular array of stationary nozzles associated therewith, said first and second rotors being disposed in axially spaced relation with each other, annular fluid passageway structure interposed between said rotors, a bearing disposed between said rotors for rotatably supporting one of said rotors, and means for supporting said bearing including a plurality of angularly spaced struts extending outwardly across said passageway; means for reducing the magnitude of the wakes caused by said strut members and for providing an increased number of smaller wakes, said means including a plurality of angularly spaced guide vanes interposed between said struts and extending substantially radially across said passageway, said guide vanes being substantially straight and of relatively less thickness than the strut members in a direction normal to the fluid flow through the passageway, and said guide vanes have their trailing edge portions disposed in planes parallel to the longitudinal axis of the passageway.

4. In an axial flow elastic fluid turbine engine having a first bladed turbine rotor and an annular array of stationary nozzles associated therewith, a second bladed turbine rotor and an annular array of stationary nozzles associated therewith, said first and second rotors being disposed in axially spaced relation with each other and having shaft portions, wall structure defining an annular fluid passageway between said rotors, a bearing disposed between said rotors and rotatably supporting one of said shaft portions and means for supporting said bearing including a plurality of angularly spaced struts extending outwardly across said passageway, said struts being connected to said wall structure; means for reducing the magnitude of the wakes caused by said strut members and for providing an increased number of smaller wakes, said last mentioned means including a plurality of angularly spaced guide vanes interposed between said struts and extending outwardly across said passageway, said guide vanes being connected to said wall structure, said guide vanes being substantially straight and of relatively less thickness than said strut members in a direction normal to the fluid flow through the passageway, and said guide vanes and strut members being uniformly spaced and disposed in planes parallel to the longitudinal axis of said passageway.

5. In an axial flow elastic fluid turbine engine having a first bladed turbine rotor and an annular array of stationary nozzles associated therewith, a second bladed turbine rotor and an annular array of stationary nozzles associated therewith, said first and second rotors having shaft portions and being disposed in axially spaced relation with each other, tubular wall structure defining an annular fluid passageway between said rotors, a bearing associated with one of said shaft portions and rotatably supporting one of said rotors, and means for supporting said bearing including a plurality of angularly spaced strut structures extending across said passageway, said strut structures including fairing portions of airfoil shape and being connected to said wall structure, means for reducing the magnitude of the wakes caused by said fairing portions and for providing an increased number of smaller wakes, said last mentioned means including a plurality of angularly spaced guide vanes interposed between said fairing portions and extending outwardly across said passageway, means connecting said guide vanes to said wall structure, said guide vanes being substantially flat and of relatively less thickness than said fairing portions in a direction normal to the fluid flow through the passageway, and said guide vanes and fairing portions being uniformly spaced and disposed in planes parallel to the longitudinal axis of said passageway.

6. In an axial flow elastic fluid turbine engine having a first bladed turbine rotor and an annular array of stationary nozzles associated therewith, a second bladed turbine rotor and an annular array of stationary nozzles associated therewith, said first and second rotors having shaft portions and being disposed in axially spaced relation with each other, tubular wall structure defining an annular fluid passageway between said rotors, a bearing associated with one of said shaft portions and rotatably supporting one of said rotors, and means for supporting said bearing including a plurality of angularly spaced struts extending outwardly across said passageway and connected to said tubular wall structure; means for reducing the magnitude of the wakes caused by said strut members and for providing an increased number of smaller wakes, said means including a plurality of angularly spaced guide vanes interposed between said struts, said guide vanes extending substantially radially across said passageway and being connected to said wall structure, said guide vanes being substantially straight and of relatively less thickness than the strut members in a direction normal to the fluid flow through the passageway, and said guide vanes have their trailing edge portions disposed in planes parallel to the longitudinal axis of the passageway.

References Cited in the file of this patent

UNITED STATES PATENTS

| | | |
|---|---|---|
| 1,320,671 | Baumann | Nov. 4, 1919 |
| 2,492,672 | Wood | Dec. 27, 1949 |
| 2,616,662 | Mierley | Nov. 4, 1952 |
| 2,676,458 | Hill | Apr. 27, 1954 |